United States Patent Office 2,921,937
Patented Jan. 19, 1960

2,921,937
1,4-DIBROMO AND 1,4-DI-ACYLOXY PHENAZINES AND PROCESS OF PREPARING

Philip N. Gordon, Old Lyme, and Robert E. Kent and Joseph J. Ursprung, Waterford, Conn., assignors to Chas. Pfizer & Co., Inc., New York, N.Y., a corporation of Delaware No Drawing. Application April 15, 1958
Serial No. 728,551

5 Claims. (Cl. 260—267)

This application is concerned with a new and useful method for the preparation of certain acyloxylated derivatives of 1,2,3,4-tetrahydrophenazine-N,N'-dioxides and 2,3-dimethylquinoxaline-N,N'-dioxides in high yields using inexpensive reagents. It is also concerned with certain useful intermediates in the process.

These acyloxylated compounds are useful because they can be convverted by known hydrolysis reactions to analogous hydroxylated compounds which are useful in the treatment of various pathological conditions. Hydroxylated 1,2,3,4-tetrahydrophenazine-N,N'-dioxides are useful anti-infective agents as described in copending patent application Serial No. 670,877, filed July 10, 1957. Hydroxylated 2,3-dimethylquinoxaline-N,N'-dioxides are useful in the control of amoeba and virus caused infections as disclosed in U.S. Patent No. 2,626,259 and also as anthelmintic agents as disclosed in copending patent application Serial No. 674,581, filed July 29, 1957.

The acyloxylated compounds which are prepared in accordance with the instant invention include those having the formula

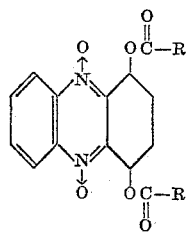

and

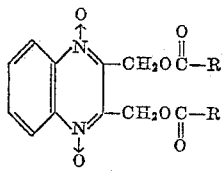

wherein R is an alkyl group containing up to four carbon atoms.

In a preferred method of practicing the invention, especially preferred because the intermediates produced thereby are crystalline compounds which can be readily isolated in high yield and purity, the dehydroxylated N,N'- dioxides, that is, 1,2,3,4-tetrahydrophenazine-N,N'-dioxide and 2,3,-dimethylquinoxaline-N,N'-dioxide are first brominated and then converted to diacyloxy derivatives, each acyloxy group containing up to five carbon atoms. For the conversion of these compounds to the hydroxylated products referred to in the above referenced patent and patent applications, the diacycloxylated compounds are hydrolyzed in accordance with known procedures fully exemplified in the appended examples.

In the first step of this invention, the selected starting compound is reacted with bromine in a reaction inert liquid solvent medium. The solvent selected should be one which is not brominated under the conditions of the reaction. Among the preferred solvents are liquid alkane solvents, and liquid halogenated alkane solvents as well as N-alkylated lower amides such as N-methyl formamide and N,N-dimethyl formamide.

The amount of solvent used is not critical, it being only necessary to use sufficient solvent to provide a reaction medium for the reactants. It is preferred, however, to use enough solvent to completely dissolve the reactants since under these conditions there is less danger of decomposition of the reactants or final product.

The reaction is best accomplished by taking up the starting compound in the selected solvent and adding to this mixture a solution containing from about 2 to about 8 moles of bromine for each mole of starting compound present. It is preferred to utilize 6 moles of bromine for each mole of starting compound since this provides optimum yields of the desired products.

The reaction mixture is then maintained at an elevated temperature, say, for example, about 60° C. to about 120° C. for a period of from about one to about three hours. It is most convenient to reflux the reaction mixture at the boiling point of the selected solvent for the chosen period of time.

The time and temperature ranges given above are not critical and represent simply the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with concomitant decrease in reaction time, but the difficulties of controlling the reaction are increased due to the evolution of copious amounts of hydrogen bromide. It is, therefore, possible to carry out the reaction at temperatures as low at 35° C. and as high as 180° C. during a period of from fifteen minutes to five hours, preferably 60° C. to 120° C. for from one to three hours.

After the reaction period, the mixture is cooled and at least a portion of the product precipitates as the hydrobromide. This is readily converted to the free base by treatment with an alkaline reagent such as the hydroxide, carbonate or bicarbonate of an alkali metal or alkaline earth metal. It is most conveniently accomplished by slurrying the salt in a slight excess of aqueous alkaline solution, for example, five percent aqueous sodium bicarbonate.

In the event that all of the hydrobromide does not precipitate the reaction mixture should be slurried with an aqueous alkaline reagent such as an oxide, hydroxide, carbonate or bicarbonate of an alkali metal or alkaline earth metal salt so as to convert the hydrobromide to the free base in situ. The free base can then be recovered by evaporating the solvent. The precipitated bromide salt is first removed by filtration.

It is not necessary to convert an acid addition salt to a free base before proceeding to the next step of this process. It is, however, preferred to do so, since otherwise the neutralization of the hydrobromide will require some of the tertiary amine which is used in the next step.

The dibromides of tetrahydrophenazines prepared in accordance with the procedure described are therapeutically useful because of their antipathogenic activity, particularly against fungi. For example, the minimum inhibitory concentration of 1,4-dibromo-1,2,3,4-tetrahydrophenazine-N,N'-dioxide against *Trichophyton sulfureum*, Hormodendron sp. Wehmeyer, *Cladosporium herbarum* and *Cospora lactic* is only ten micrograms per milliliter and against *Pittosporum ovale*, the minimum concentration is less than one microgram per milliliter. These fungi will be recognized as the causative agent of many pathogenic conditions of plants and animals, including man.

In the next step of the valuable synthetic process, the bromine atoms are replaced with acyloxy groups. This is accomplished by reacting the dibromo compound with a tertiary amine salt of an alkanoic acid, the alkyl of the acid containing up to four carbon atoms. The amine salt is conveniently formed in situ by simply mixing the amine and the acid. Any tertiary amine is suitable, and the choice will usually be made on the basis of the economic avilability of the amine. Preferred amines include trimethylamine, triethylamine, pyridine and dimethylaniline.

A preferred method of carrying out this reaction employs a large excess of amine and acid, about 2.3 to about 2.8 moles of tertiary amine and about 4.3 to about 4.8 moles of acid per mole of dibromide being preferred. Larger mole ratios of amine and acid to dibromide can be used, but without appreciable increase in the yield. Smaller amounts of amine and acid, for example, reaction equivalent of acid, that is, 2.0 moles of acid per mole of dibromide with as little as 1.5 moles of amine per mole of dibromide, may also be used. Use of these small amounts of reactants, however, considerably increases the length of time required for the reaction.

The reaction is carried out by taking up the reactants in a suitable solvent which may include liquid alkane and halogenated alkane solvents at a temperature of from about 15° C. to about 120° C. for from about an hour to about twenty-four hours. It is preferred to use a solvent whose reflux temperature at atmospheric pressure is from about 50° C. to about 75° C. and to reflux the reaction mixture for from about two to about four hours.

At the end of the reaction period, the desired product can be isolated by removing the solvent, for example, by evaporating in vacuo. It can be purified by recrystallization from a suitable solvent such as benzene. It is, however, not necessary to purify the product before proceeding to the hydrolysis step.

It will be apparent that the process of this invention can be utilized for the preparation of various substituted derivatives of 1,4-diacyloxylated-1,2,3,4-tetrahydrophenazine-N,N'-dioxides and 2,3-bis(acyloxymethyl)quinoxaline-N,N'-dioxides. Certain of these derivatives such as chloro, bromo, iodo, nitro, cyano, alkyl and alkoxy substituted tetrahydrophenazine-N,N'-dioxides are known to have useful therapeutic activity.

Those skilled in the art will recognize that the 1,4-disubstituted - 1,2,3,4 - tetrahydrophenazine - N,N'-dioxides and free bases prepared by the process of the invention can exist in two epimeric forms. With respect to the dibromides, it is believed from steric considerations that the reactions produce a major portion of the epimer in which the bromine atoms are in the transconfiguration.

Both epimers, however, are active antifungal agents and both are useful for the preparation of the diacyloxy compounds. There is, therefore, no necessity of separating them, but this can be accomplished by fractional crystallization. With respect to the diacyloxy compounds, both epimers are hydrolyzed with equal facility so that again there is no necessity of separating the epimers. As stated in copending patent application Serial No. 670,877 both epimers of the dihydroxylated compounds are therapeutically active. If desired, the epimers can be separated either at the diacycloxy stages as illustrated in the appended examples or at the dihydroxy stage as illustrated in said copending patent application.

In the examples the compounds referred to as normal are those which on hydrolysis produce the higher melting epimer of 1,4-dihydroxy-1,2,3,4-tetrahydrophenazine-N,N'-dioxides and the epi compounds are those which on hydrolysis produce the lower melting epimer of these same compounds. This is done merely to facilitate the language and no inference is intended as to the absolute configuration of the various atoms in the molecules.

The following examples are given solely for the purpose of illustration and are not to be construed as limitations of this invention, many apparent variations of which are possible without departing from the spirit or scope thereof.

EXAMPLE I

*1,2,3,4-tetrahydrophenazine-N,N'-dioxide*

A total of 25 g. of 1,2,3,4-tetrahydrophenazine was slowly dissolved in 100 ml. of 40% peracetic acid while maintaining the temperature at 25–30° C. The initial evolution of heat was controlled by keeping the reaction mixture in an ice bath. When the evolution of heat had subsided the mixture was allowed to stand at room temperature for 48 hours. The volume of solution was then decreased to about one-half the original volume in vacuo and 50 ml. of water was added. The solution was neutralized with 40% aqueous sodium hydroxide and extracted with methylene chloride. The methylene chloride solution was charcoal, filtered and the pale yellow solution evaporated to a small volume, and the product precipitated as coarse, granular yellow crystals melting at 180–182° C. with decomposition.

EXAMPLE II

*1,4-dibromo-1,2,3,4-tetrahydrophenazine-N,N'-dioxide*

A solution was prepared containing 1.0 mole of 1,2,3,4-tetrahydrophenazine-N,N'-dioxide in 1600 ml. of chloroform. To this solution there was added 2.13 moles of bromine in 800 ml. of chloroform. The solution was refluxed (about 60° C.) for 2 hours. The reaction was accompanied by the evolution of copious amounts of hydrogen bromide and by the formation of a precipitate. The mixture was cooled to 15° C. and filtered to obtain the hydrobromide salt. This salt was slurried in an excess of 5% sodium bicarbonate solution to form the free base which was recovered by filtration; melting point 171–173° C. d.

EXAMPLE III

*2,3-bis(bromomethyl)quinoxaline-N,N'dioxide*

A solution was prepared containing 1.0 mole of 2,3-dimethyl-quinoxaline-N,N'-dioxide (prepared in accordance with the procedures set forth in United States Patent No. 2,626,259, issued January 20, 1953) in 1600 ml. of chloroform. To this solution was added 2.13 moles of bromine in 800 ml. of chloroform. The solution was refluxed (about 60° C.) for 2 hours. The reaction was accompanied by the evolution of copious amounts of hydrogen bromide and the formation of a precipitate. The mixture was cooled to 15° C. and filtered to obtain the hydrobromide salt which was converted to the free base by treatment with an excess of 5% aqueous sodium bicarbonate. The free base was recovered by filtration and melted at 180–190° C. d.

EXAMPLE IV

*1,4-dibromo-1,2,3,4-tetrahydrophenazine-N,N'-dioxide*

A solution was prepared containing 1 mole of 1,2,3,4-tetrahydrophenazine-N,N'-dioxide in 1600 ml. of carbon tetrachloride. To this solution there was added 2 moles of bromine in 800 ml. of carbon tetrachloride. The solution was refluxed (about 76° C.) for 3 hours. The reaction was accompanied by the evolution of copious amounts of hydrogen bromide and by the formation of a precipitate. The mixture was cooled to 150° C. and filtered to obtain the hydrobromide salt. This salt was slurried in an excess of 5% sodium hydroxide solution to form the free base which was recovered by filtration; melting point 171–173° C. d.

EXAMPLE V

*2,3-bis(bromomethyl)quinoxaline-N,N'-dioxide*

A solution was prepared containing 1 mole of 2,3-dimethyl-quinoxaline-N,N'-dioxide (prepared in accordance with the procedures set forth in United States Patent No. 2,626,259, issued January 20, 1953) in 1600 ml. of heptane. To this solution there was added 8 moles of bromine in 800 ml. of heptane. The solution was refluxed (about 98° C.) for 5 hours. The reaction was accompanied by the evolution of copious amounts of hydrogen bromide and the formation of a precipitate. The mixture was cooled to 15° C. and filtered to obtain the hydrobromide salt which was converted to the free base by treatment with an excess of 5% aqueous sodium carbonate. The free base was recovered by filtration and melted at 180–190° C. d.

EXAMPLE VI

*1,4-dibromo-1,2,3,4-tetrahydrophenazine-N,N'-dioxide*

A solution was prepared containing 1 mole of 1,2,3,4-tetrahydrophenazine-N,N'-dioxide in 1600 ml. of N-methyl formamide. To this solution there was added 6 moles of bromine in 800 ml. of N-methyl formamide. The solution was heated at 180° C. for fifteen minutes. The reaction was accompanied by the evolution of copious amounts of hydrogen bromide and by the formation of a precipitate. The mixture was cooled to 15° C. and filtered to obtain the hydrobromide salt. This salt was slurried in an excess of 5% sodium bicarbonate solution to form the free base which was recovered by filtration; melting point 171–173° C. d.

EXAMPLE VII

*2,3-bis(bromomethyl)quinoxaline-N,N'-dioxide*

A solution was prepared containing 1.0 mole of 2,3-dimethyl-quinoxaline-N,N'-dioxide (prepared in accordance with the procedure set forth in United States Patent No. 2,626,259, issued January 20, 1953) in 1600 ml. of N,N-dimethyl formamide. To this solution was added 8 moles of bromine in 800 ml. of N,N'-dimethyl formamide. The solution was maintained at 35° C. for 5 hours. The reaction was accompanied by the evolution of copious amounts of hydrogen bromide and the formation of a precipitate. The mixture was cooled to 15° C. and filtered to obtain the hydrobromide salt which was converted to the free base by treatment with an excess of 5% aqueous sodium bicarbonate. The free base was recovered by filtration and melted at 180–190° C. d.

EXAMPLE VIII

*1,4-diacetoxy-1,2,3,4-tetrahydrophenazine-N,N'-dioxide*

A solution was prepared containing 0.8 moles of 1,4-dibromo-1,2,3,4-tetrahydrophenazine - N,N' - dioxide in 2400 ml. of chloroform and 3.6 moles of acetic acid together with 2.0 moles of triethylamine was added. The reaction mixture was refluxed in the dark for 4 hours and concentrated to 300 ml. to obtain a mixture of epi-1,4-diacetoxy-1,2,3,4-tetrahydrophenazine-N,N' - dioxide and 1,4-diacetoxy-1,2,3,4-tetrahydrophenazine-N,N' - dioxide. The mixture was separated by fractional crystallization from chloroform in which solvent the epi compound is less soluble. Each fraction was further purified, the epi fraction by recrystallization from acetone and the other by recrystallization from methanol.

EXAMPLE IX

*2,3-bis(diacetoxymethyl)quinoxaline-N,N'-dioxide*

A solution was prepared containing 0.8 moles of 2,3-bis(bromomethyl)quinoxaline-N,N'-dioxide in 2400 ml. of chloroform. To this solution was added 3.6 moles of acetic acid and 2.0 moles of trimethylamine. The reaction mixture was refluxed for 24 hours and concentrated to a volume of 300 ml. The desired product was recovered by filtration. The product melted at 170–171° C. with decomposition.

EXAMPLE X

*1,4-diacetoxy-1,2,3,4-tetrahydrophenazine-N,N'-dioxide*

A soultion was prepared containing 0.8 moles of 1,4-dibromo-1,2,3,4-tetrahydrophenazine-N,N' - dioxide in 2400 ml. of carbon tetrachloride. To this solution there was added 1.5 moles of pyridine and 2.0 moles of acetic acid. The reaction mixture was refluxed for 4 hours and concentrated to dryness to obtain a mixture of epimers of the desired product.

EXAMPLE XI

*2,3-bis(dipropanoyloxymethyl)quinoxaline-N,N'-dioxide*

A solution was prepared containing 0.8 mole of 2,3-bis-(bromomethyl)quinoline-N,N'-dioxide in 2400 ml. of n-heptane. To this solution there was added 2.8 moles of propionic acid and 2.5 moles of triethylamine. The reaction mixture was refluxed for 24 hours and concentrated to a volume of 300 ml. The desired product was recovered by filtration.

EXAMPLE XII

*1,4-dibutanoyloxy-1,2,3,4-tetrahydrophenazine-N,N'-dioxide*

A solution was prepared containing 0.8 mole of 1,4-dibromo-1,2,3,4-tetrahydrophenazine - N,N' - dioxide in 2400 ml. of carbon tetrachloride. To this solution there was added 2.8 moles of dimethylaniline and 4.8 moles of butyric acid. The solvent was refluxed for 4 hours and concentrated to dryness to obtain a mixture of epimers of the desired product.

EXAMPLE XIII

*1,4-pentanoyloxy-1,2,3,4-tetrahydrophenazine-N,N'-dioxide*

A solution was prepared containing 0.8 mole of 1,4-dibromo-1,2,3,4-tetrahydrophenazine - N,N' - dioxide in 2400 ml. of chloroform. To this solution there was added 1.5 moles of dimethylaniline and 2.0 moles of pentanoic acid. The reaction mixture was refluxed for 1 hour and concentrated to dryness to obtain a mixture of epimers of the desired product.

EXAMPLE XIV

*1,4-acetoxy-1,2,3,4-tetrahydrophenazine-N,N'-dioxide*

A solution was prepared containing 0.8 mole of 1,4-dibromo-1,2,3,4-tetrahydrophenazine - N,N' - dioxide in 2400 ml. of chloroform. To this solution there was added 2.8 moles of pyridine and 4.8 moles of acetic acid. The reaction mixture was refluxed for 3 hours and concentrated to dryness to obtain a mixture of epimers of the desired product.

EXAMPLE XV

*Hydrolysis of mixture of epi-1,4-diacetoxy-1,2,3,4-tetrahydrophenazine-N,N'-dioxide and the normal compound*

A mixture of epi-1,4-diacetoxy-1,2,3,4-tetrahydrophenazine-N,N'-dioxide and N-1,4-diacetoxy-1,2,3,4-tetrahydrophenazine-N,N'- dioxide weighing 0.5 g. was dissolved in 1 ml. of 24 normal sulfuric acid at room temperature. The mixture was allowed to stand for 7 hours and 7 ml. of water was added with cooling. The precipitate which formed was recovered by filtration and air dried. The products were separated by fractional crystallization and shown to be the corresponding dihydroxy compounds.

EXAMPLE XVI

*2,3-bis(dihydroxymethyl)quinoxaline-N,N'-dioxide*

A solution containing 1.0 g. of 2,3-bis(diacetoxymethyl) quinoxaline-N,N'dioxide in 2 ml. of 24 normal sulfuric acid was allowed to stand at room temperature for 2 hours. The reaction mixture was then carefully diluted with 14 ml. of water and extracted with chloroform. The chloroform extract was evaporated to dryness and the desired product purified by recrystallization from methanol.

EXAMPLE XVII

Normal-1,4-dihydroxy-1,2,3,4-tetrahydrophenazine-N,N'-dioxide

A solution was prepared containing 1 g. of normal-1,4-diacetoxy-1,2,3,4-tetrahydrophenazine-N,N'-dioxide in 2 ml. of 24 normal sulfuric acid and allowed to stand at room temperature for 2 hours. The reaction mixture was then carefully diluted with about 14 ml. of water and the solution extracted 3 times with equal volumes of chloroform. The chloroform extract was evaporated to dryness and the product recrystallized from acetone-chloroform.

EXAMPLE XVIII

Epi-1,4-dihydroxy-1,2,3,4-tetrahydrophenazine-N,N'-dioxide

A solution was prepared containing 1 g. of normal-1,4-diacetoxy-1,2,3,4-tetrahydrophenazine-N,N'-dioxide in 2 ml. of 24 normal sulfuric acid and allowed to stand at room temperature for 2 hours. The reaction mixture was then carefully diluted with about 14 ml. of water and the solution extracted 3 times with equal volumes of chloroform. The chloroform extract was evaporated to dryness and the product recrystallized from acetone-chloroform.

What is claimed is:
1. A compound selected from the group consisting of those having the formula

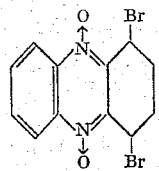

and the pharmaceutically acceptable acid addition salts thereof.

2. The process for the preparation of the compound of the formula:

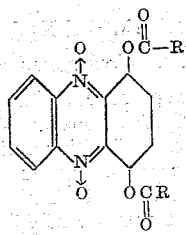

wherein R is alkyl containing up to 4 carbon atoms which comprises reacting 1,2,3,4-tetrahydrophenazine-N,N'-dioxide with from about 2 moles to about 8 moles of bromine per mole of dioxide at a temperature of from about 60° C. to about 120° C. for from about one to about three hours in a liquid solvent medium selected from the group consisting of liquid alkanes, halogenated alkanes, N-methylformamide and N,N-dimethylformamide; reacting resulting dibromo compound with from about 1.5 to about 2.8 moles of tertiary amine and 2.0 to 4.8 moles of alkanoic acid per mole of dibromide, the alkyl group of said acid containing up to four carbon atoms, said tertiary amine being selected from the group consisting of triethylamine, trimethylamine, pyridine and dimethylaniline in a liquid solvent medium selected from the group consisting of liquid alkanes and liquid halogenated alkanes at a temperature of from about 15° C. to about 120° C. for a period of from about one to about twenty-four hours.

3. The process for the preparation of the compound of the formula:

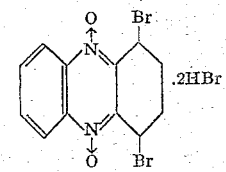

which comprises reacting 1,2,3,4-tetrahydrophenazine-N,N'-dioxide with from about 2 moles to about 8 moles of bromine per mole of dioxide in a liquid solvent medium selected from the group consisting of liquid alkanes, liquid halogenated alkanes, N-methylformamide and N,N'-dimethylformamide.

4. The process of claim 3 wherein the free base of said compound of said formula is prepared by neutralizing the dihydrobromide.

5. The process for the preparation of the compound of the formula:

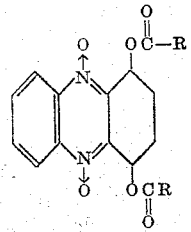

wherein R is alkyl containing up to 4 carbon atoms which comprises reacting a compound selected from the group consisting of

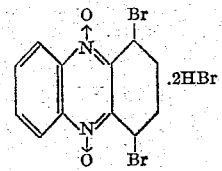

and the free base thereof with from about 1.5 to about 2.8 moles of tertiary amine and 2.0 to 4.8 moles of alkanoic acid per mole of dibromide, the alkyl group of said acid containing up to four carbon atoms, said tertiary amine being selected from the group consisting of triethylamine, trimethylamine, pyridine and dimethylaniline in a liquid solvent medium selected from the group consisting of liquid alkanes and liquid halogenated alkanes at a temperature of from about 15° C. to about 120° C. for a period of from about one to about twenty-four hours.

No references cited.